United States Patent
Lagree

(10) Patent No.: US 8,280,653 B2
(45) Date of Patent: Oct. 2, 2012

(54) ZONE SELECTIVE INTERLOCKING TEST METHOD AND APPARATUS, AND CIRCUIT INTERRUPTER APPARATUS AND POWER DISTRIBUTION SYSTEM INCLUDING THE SAME

(75) Inventor: James L. Lagree, Robinson Township, PA (US)

(73) Assignee: Eaton Corporation, Cleveland, OH (US)

( * ) Notice: Subject to any disclaimer, the term of this patent is extended or adjusted under 35 U.S.C. 154(b) by 329 days.

(21) Appl. No.: 12/368,688

(22) Filed: Feb. 10, 2009

(65) Prior Publication Data

US 2010/0204933 A1 Aug. 12, 2010

(51) Int. Cl.
*G01R 31/00* (2006.01)
*H02H 7/00* (2006.01)
*H02H 3/00* (2006.01)
(52) U.S. Cl. ............................... 702/58; 361/63; 361/94
(58) Field of Classification Search ...................... 702/58
See application file for complete search history.

(56) References Cited

U.S. PATENT DOCUMENTS

| | | | |
|---|---|---|---|
| 4,468,714 A * | 8/1984 | Russell | 361/62 |
| 4,751,606 A | 6/1988 | Matsko et al. | |
| 4,752,853 A | 6/1988 | Matsko et al. | |
| 4,794,484 A | 12/1988 | Matsko et al. | |
| 4,809,125 A | 2/1989 | Matsko et al. | |
| 4,827,369 A | 5/1989 | Saletta et al. | |
| 5,089,928 A * | 2/1992 | Durivage et al. | 361/94 |
| 5,483,408 A | 1/1996 | Matsko et al. | |
| 5,559,719 A | 9/1996 | Johnson et al. | |
| 5,576,695 A * | 11/1996 | Minger et al. | 340/649 |
| 5,734,576 A * | 3/1998 | Klancher | 700/293 |
| 5,875,088 A * | 2/1999 | Matsko et al. | 361/96 |
| 6,313,975 B1 * | 11/2001 | Dunne et al. | 361/64 |
| 6,654,219 B1 * | 11/2003 | Romano et al. | 361/78 |
| 2005/0219775 A1 | 10/2005 | Shipp et al. | |

* cited by examiner

*Primary Examiner* — Sujoy K. Kundu
*Assistant Examiner* — Michael Dalbo
(74) *Attorney, Agent, or Firm* — Eckert Seamans Cherin & Mellott, LLC; Kirk D. Houser

(57) ABSTRACT

A circuit interrupter apparatus includes circuit interrupter and a device. The circuit interrupter includes separable contacts, an operating mechanism structured to open and close the separable contacts, and a trip mechanism cooperating with the operating mechanism to trip open the separable contacts. The trip mechanism includes a zone selective interlocking input and a zone selective interlocking output. The device includes a first input electrically interconnected with the zone selective interlocking input, a second input electrically interconnected with the zone selective interlocking output, and an indicator circuit structured to indicate that the zone selective interlocking input occurred at the first input or that the zone selective interlocking output occurred at the second input.

7 Claims, 7 Drawing Sheets

```
                    140
```

| EMPLOYING A PLURALITY OF CIRCUIT INTERRUPTERS IN A POWER DISTRIBUTION SYSTEM, EACH OF THE CIRCUIT INTERRUPTERS BEING IN ONE OF THE ZONES OF THE POWER DISTRIBUTION SYSTEM AND INCLUDING A ZONE SELECTIVE INTERLOCKING INPUT AND A ZONE SELECTIVE INTERLOCKING OUTPUT | —142 |

↓

| ELECTRICALLY INTERCONNECTING THE ZONE SELECTIVE INTERLOCKING OUTPUT OF ONE OF THE CIRCUIT INTERRUPTERS IN ONE OF THE ZONES WITH THE ZONE SELECTIVE INTERLOCKING INPUT OF ANOTHER ONE OF THE CIRCUIT INTERRUPTERS IN ANOTHER UPSTREAM ONE OF THE ZONES | —144 |

↓

| CAUSING A TRIP OF THE ONE OF THE CIRCUIT INTERRUPTERS | —146 |

↓

| OUTPUTTING THE ZONE SELECTIVE INTERLOCKING OUTPUT OF THE ONE OF THE CIRCUIT INTERRUPTERS IN THE ONE OF THE ZONES TO THE ZONE SELECTIVE INTERLOCKING INPUT OF THE OTHER ONE OF THE CIRCUIT INTERRUPTERS IN THE OTHER UPSTREAM ONE OF THE ZONES | —148 |

↓

| EMPLOYING A DEVICE OPERATIVELY ASSOCIATED WITH EACH OF THE CIRCUIT INTERRUPTERS TO MONITOR THE ZONE SELECTIVE INTERLOCKING INPUT AND THE ZONE SELECTIVE INTERLOCKING OUTPUT THEREOF | —150 |

↓

| INDICATING FROM THE DEVICE OPERATIVELY ASSOCIATED WITH EACH OF THE CIRCUIT INTERRUPTERS WHETHER THE ZONE SELECTIVE INTERLOCKING INPUT AND THE ZONE SELECTIVE INTERLOCKING OUTPUT THEREOF OCCURRED | —152 |

↓

| CHECKING THE DEVICE OPERATIVELY ASSOCIATED WITH EACH OF THE CIRCUIT INTERRUPTERS TO VERIFY THAT THE ZONE SELECTIVE INTERLOCKING OUTPUT OF THE ONE OF THE CIRCUIT INTERRUPTERS WAS RECEIVED BY A PROPER COUNT OF THE CIRCUIT INTERRUPTERS AND CONVERSELY WAS NOT RECEIVED BY ANY OF THE CIRCUIT INTERRUPTERS THAT SHOULD NOT HAVE RECEIVED THE ZONE SELECTIVE INTERLOCKING OUTPUT OF THE ONE OF THE CIRCUIT INTERRUPTERS IN THE ONE OF THE ZONES | —154 |

*FIG. 7*

ZONE SELECTIVE INTERLOCKING TEST METHOD AND APPARATUS, AND CIRCUIT INTERRUPTER APPARATUS AND POWER DISTRIBUTION SYSTEM INCLUDING THE SAME

BACKGROUND

1. Field

The disclosed concept pertains generally to zone selective interlocking and, more particularly, to zone selective interlocking test methods. The disclosed concept also pertains to zone selective interlocking test apparatus. The disclosed concept further pertains to circuit interrupters and power distribution systems including circuit interrupters.

2. Background Information

Circuit interrupters, such as for example and without limitation, circuit breakers, are used to protect electrical circuitry from damage due to an overcurrent condition, such as an overload condition, a short circuit, or another fault condition, such as an arc fault or a ground fault. Molded case circuit breakers typically include a pair of separable contacts per phase. The separable contacts may be operated either manually by way of a handle disposed on the outside of the case or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Zone selective interlocking (ZSI) (e.g., also known as "zone interlocking") is a method of controlling circuit breakers in order to provide selectivity with relatively very short delay times, irrespective of the number of zones (e.g., without limitation, a line side zone; a load side zone; a number of upstream zones; a number of downstream zones; a number of grading levels) and the location of a fault in a power distribution system. A ZSI input and a ZSI output are provided at each circuit breaker. Interlocking may be applied to faults between phases or earth-faults or both.

As one example, zone interlocking uses a communication scheme to connect line and load circuit breaker trip units together. When a fault occurs, the trip units communicate to determine which load side circuit breaker is closest to the fault. The trip unit in the circuit breaker closest to the fault overrides any customer-defined delay and opens instantaneously, thereby clearing the fault and allowing the line side circuit breakers to remain closed.

If ZSI is used in several zones, then each circuit breaker affected by, for example, a short circuit current (i.e., upstream of the fault) interrogates the circuit breaker(s) directly downstream of that affected circuit breaker to determine whether the short circuit current is present in or is affecting the adjacent downstream zone. A delay setting $t_{ZSI}$ is adjusted at each circuit breaker to ensure that the downstream circuit breaker, directly upstream of the fault, has time to interrupt the fault current. The advantages of ZSI increase with additional zones, since time-based selectivity can result in unacceptably long delays at the upstream power source end of the system.

Several examples of the operation of ZSI are discussed in connection with FIG. 1, which shows an example power distribution system using multiple power sources in the upstream ZONE 1. In this example, there are two downstream zones, ZONE 2 and ZONE 3, although any suitable number of downstream zones can be employed. As a first example, there is a fault, such as a short circuit, at position 3. Circuit breakers CB1, CB2, CB3, CB5 and CB7 detect the short circuit. CB7 blocks CB5 by the ZSI OUT signal of CB7 and, as a result, also CB1, CB2 and CB3, in order that they do not trip for $t_{ZSI}$=50 ms. Since CB7 does not receive a blocking ZSI IN signal from a subordinate, downstream circuit breaker, CB7 is responsible for interrupting the short circuit as quickly as possible. In the event of a problem with circuit breaker CB7 (e.g., because CB7 is no longer operational), then upstream CB5, as a back-up, trips after its short time delay setting, $t_{SD}$=150 ms.

As a second example, there is a short circuit at position 2. Circuit breakers CB1, CB2, CB3 and CB5 detect the short circuit, but CB7 does not. For this reason, CB5 does not receive a blocking ZSI IN signal from CB7, but provides a blocking ZSI OUT signal to CB1, CB2 and CB3. This information tells CB5 that it is the closest breaker upstream of the short circuit. CB5 trips with a delay of $t_{ZSI}$=50 ms instead of with a delay of $t_{SD}$=150 ms. Here, the clearance time is reduced by 100 ms (=$t_{SD}$-$t_{ZSI}$=150 ms-50 ms).

As a third example, there is a short circuit at position 1. Only circuit breakers CB1, CB2 and CB3 detect the short circuit and they do not receive a blocking ZSI IN signal from any circuit breaker at a subordinate, downstream zone. For this reason, CB1, CB2 and CB3 trip after $t_{ZSI}$=50 ms. Here, the time saved is 250 ms (=$t_{SD}$-$t_{ZSI}$=300 ms-50 ms).

There is no known system to fully test and properly verify a zone selective interlocking system.

There is room for improvement in zone selective interlocking.

There is also room for improvement in circuit interrupters and power distribution systems including circuit interrupters, which employ zone selective interlocking.

SUMMARY

These needs and others are met by embodiments of the disclosed concept, which provide a device comprising: a first input electrically interconnected with a zone selective interlocking input, a second input electrically interconnected with a zone selective interlocking output, and an indicator circuit structured to indicate that the zone selective interlocking input occurred at the first input or that the zone selective interlocking output occurred at the second input.

In accordance with one aspect of the disclosed concept, a circuit interrupter apparatus comprises: a circuit interrupter comprising: separable contacts, an operating mechanism structured to open and close the separable contacts, and a trip mechanism cooperating with the operating mechanism to trip open the separable contacts, the trip mechanism including a zone selective interlocking input and a zone selective interlocking output; and a device comprising: a first input electrically interconnected with the zone selective interlocking input, a second input electrically interconnected with the zone selective interlocking output, and an indicator circuit structured to indicate that the zone selective interlocking input occurred at the first input or that the zone selective interlocking output occurred at the second input.

As another aspect of the disclosed concept, a power distribution system comprises: a plurality of zones; and a plurality of circuit interrupter apparatus, each of the circuit interrupter apparatus being in one of the zones and comprising: separable contacts, an operating mechanism structured to open and close the separable contacts, a trip mechanism cooperating with the operating mechanism to trip open the separable contacts, the trip mechanism including a zone selective interlocking input and a zone selective interlocking output, and a device comprising: a first input electrically interconnected with the zone selective interlocking input, a second input electrically interconnected with the zone selective interlocking output, and an indicator circuit structured to indicate that the zone selective interlocking input occurred at the first input or that the zone selective interlocking output occurred at the second input, wherein the zone selective interlocking output of one of the circuit interrupters in one of the zones is electrically interconnected with the zone selective interlocking input of another one of the circuit interrupters in another upstream one of the zones.

The device of each of the circuit interrupters may be structured to communicate to a communication network a number of transitions and a number of transition times of the zone selective interlocking input at the first input and the zone selective interlocking output at the second input.

The communication network may include a processor structured to receive communications of the number of transitions and the number of transition times from the device of each of the circuit interrupters.

The indicator circuit may comprise a reset circuit structured to remove a first indication that the zone selective interlocking input occurred at the first input and a second indication that the zone selective interlocking output occurred at the second input. The processor may be further structured to provide at least one of: (1) displaying timing of the zone selective interlocking input at the first input and the zone selective interlocking output at the second input of each of the circuit interrupters; (2) actuating the reset circuit of each of the circuit interrupters at about the same time; and (3) synchronizing the timing of the device of each of the circuit interrupters.

As another aspect of the disclosed concept, a zone selective interlocking test apparatus comprises: a first input structured to be electrically interconnected with a zone selective interlocking input of a circuit interrupter; a second input structured to be electrically interconnected with a zone selective interlocking output of the circuit interrupter; and an indicator circuit structured to indicate that the zone selective interlocking input occurred at the first input or that the zone selective interlocking output occurred at the second input.

As another aspect of the disclosed concept, a zone selective interlocking test method is for a power distribution system including a plurality of zones. The method comprises: employing a plurality of circuit interrupters in the power distribution system, each of the circuit interrupters being in one of the zones of the power distribution system and including a zone selective interlocking input and a zone selective interlocking output; electrically interconnecting the zone selective interlocking output of one of the circuit interrupters in one of the zones with the zone selective interlocking input of another one of the circuit interrupters in another upstream one of the zones; causing a trip of the one of the circuit interrupters; outputting the zone selective interlocking output of the one of the circuit interrupters in the one of the zones to the zone selective interlocking input of the another one of the circuit interrupters in the another upstream one of the zones; employing a device operatively associated with each of the circuit interrupters to monitor the zone selective interlocking input and the zone selective interlocking output thereof, indicating from the device operatively associated with each of the circuit interrupters whether the zone selective interlocking input and the zone selective interlocking output thereof occurred; and checking the device operatively associated with each of the circuit interrupters to verify that the zone selective interlocking output of the one of the circuit interrupters was received by a proper count of the circuit interrupters and conversely was not received by any of the circuit interrupters that should not have received the zone selective interlocking output of the one of the circuit interrupters in the one of the zones.

BRIEF DESCRIPTION OF THE DRAWINGS

A full understanding of the disclosed concept can be gained from the following description of the preferred embodiments when read in conjunction with the accompanying drawings in which:

FIG. 7 is a flowchart of a zone selective interlocking test procedure in accordance with another embodiment of the disclosed concept.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept is described in association with single-pole circuit breakers, although the disclosed concept is applicable to circuit interrupters having any number of poles or phases in which zone selective interlocking is applied to any fault, such as for example and without limitation, faults between phase and ground, between phases, and/or earth or ground faults.

Figure 1:
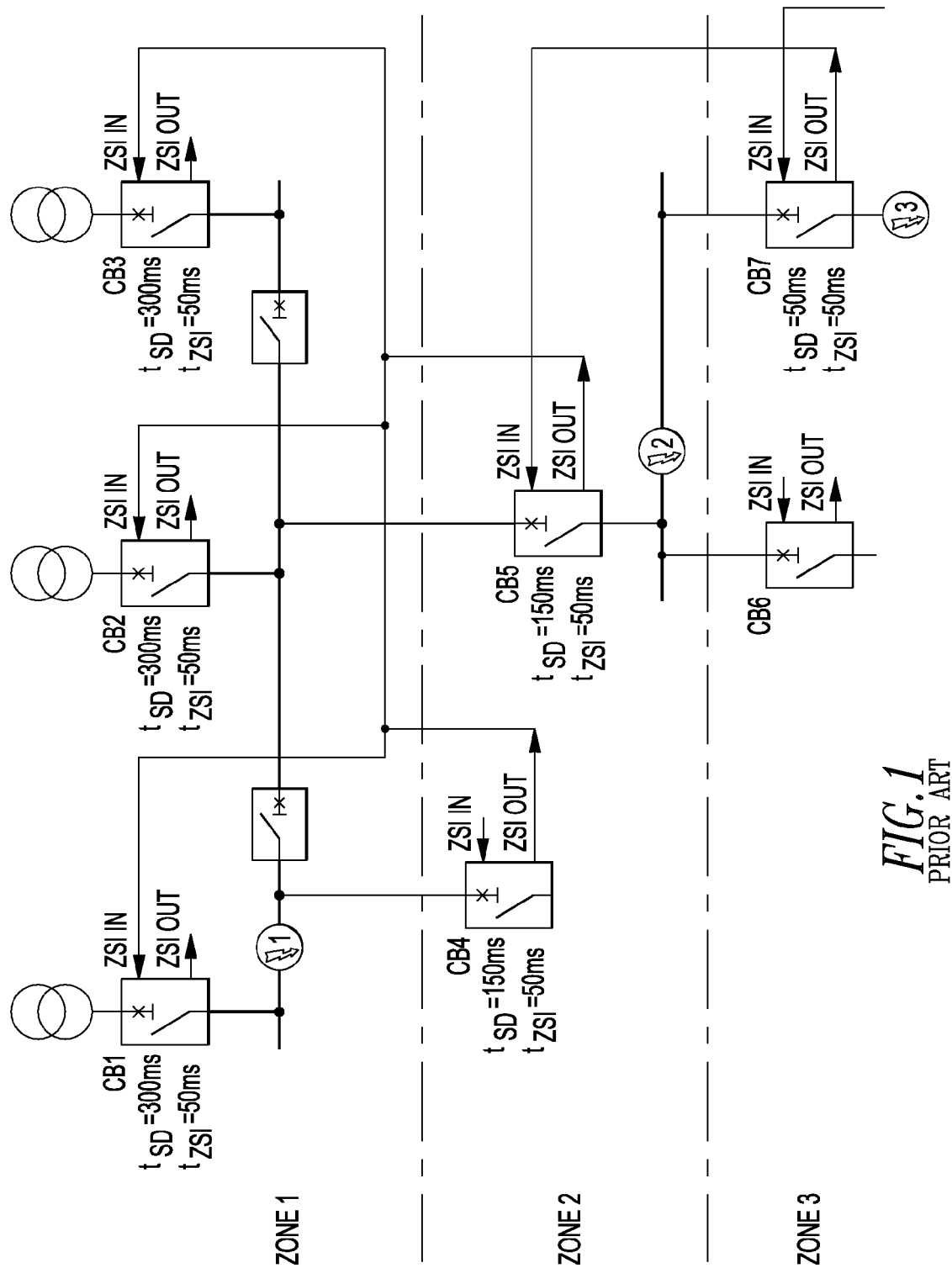
FIG. 1 is a schematic diagram of a power distribution system installation designed for multiple power supplies with zone selective interlocking.
Figure 2:
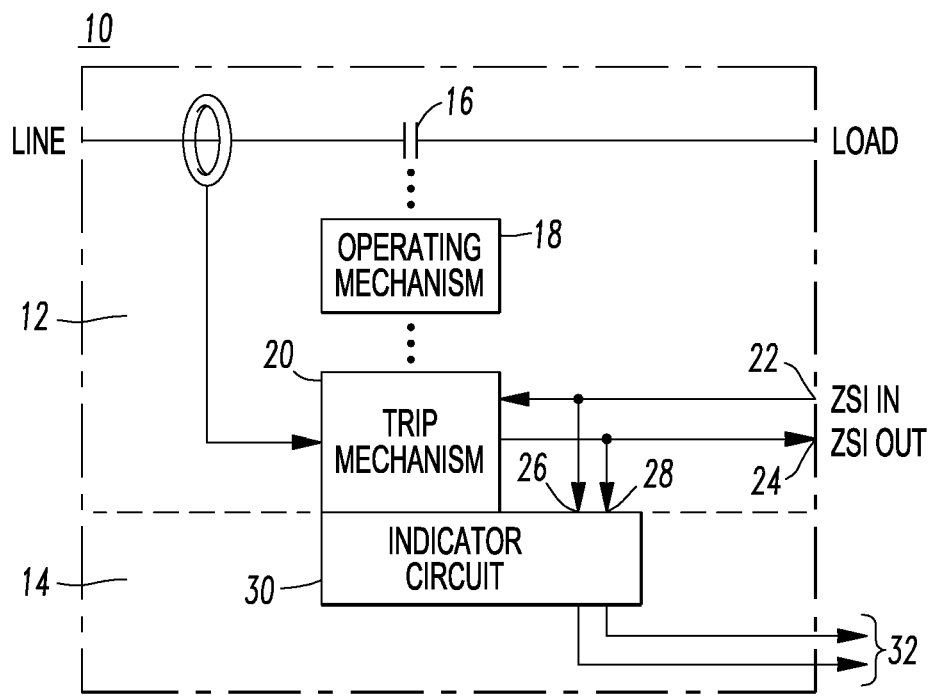
FIG. 2 is a block diagram in schematic form of a circuit interrupter apparatus in accordance with embodiments of the disclosed concept.

Referring to FIG. 2, a circuit interrupter apparatus 10 includes a circuit interrupter 12 and a device 14, such as a zone selective interlocking test apparatus. As is conventional, the circuit interrupter 12 includes separable contacts 16, an operating mechanism 18 structured to open and close the separable contacts 16, and a trip mechanism 20 (e.g., without limitation, a trip unit) cooperating with the operating mechanism 18 to trip open the separable contacts 16. The trip mechanism 20 includes a zone selective interlocking input 22 and a zone selective interlocking output 24. For example and without limitation, as is conventional, the trip unit decides when to trip, inputs a ZSI IN signal from the zone selective interlocking input 22, and outputs a ZSI OUT signal to the zone selective interlocking output 24. The device 14 includes a first input 26 electrically interconnected with the zone selective interlocking input 22, a second input 28 electrically interconnected with the zone selective interlocking output 24, and an indicator circuit 30 structured to indicate at 32 that the zone selective interlocking input 22 occurred at the first input 26 or that the zone selective interlocking output 24 occurred at the second input 28.

Figure 6:
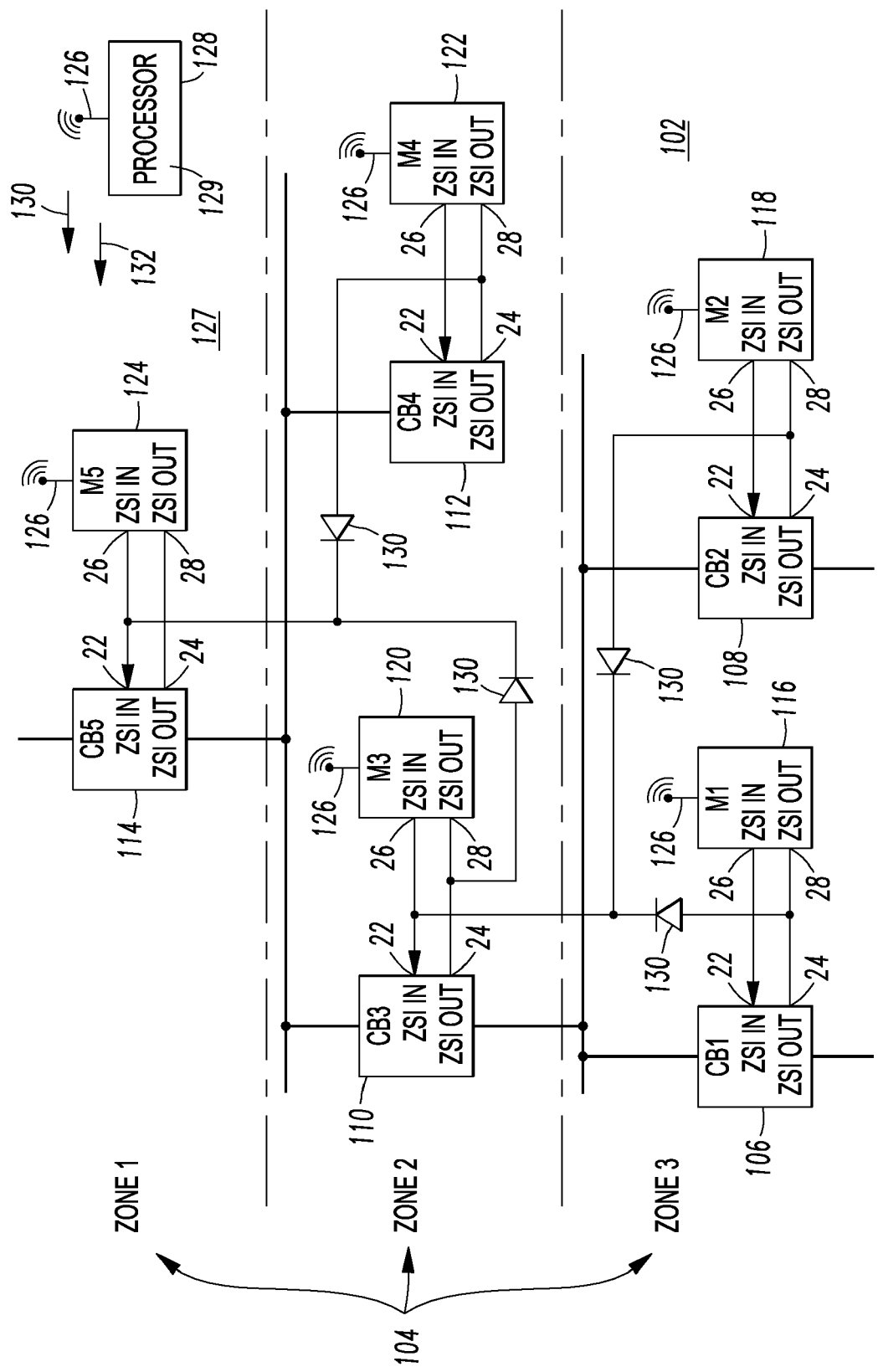
FIG. 6 is a block diagram in schematic form of a power distribution system in accordance with other embodiments of the disclosed concept.

Although the device 14 of FIG. 2 is shown as being internal to the circuit interrupter apparatus 10, the function of this device can be external to a circuit interrupter, as is shown, for example, by the example devices 116,118,120,122,124 of FIG. 6.

Example 1

Figure 3:
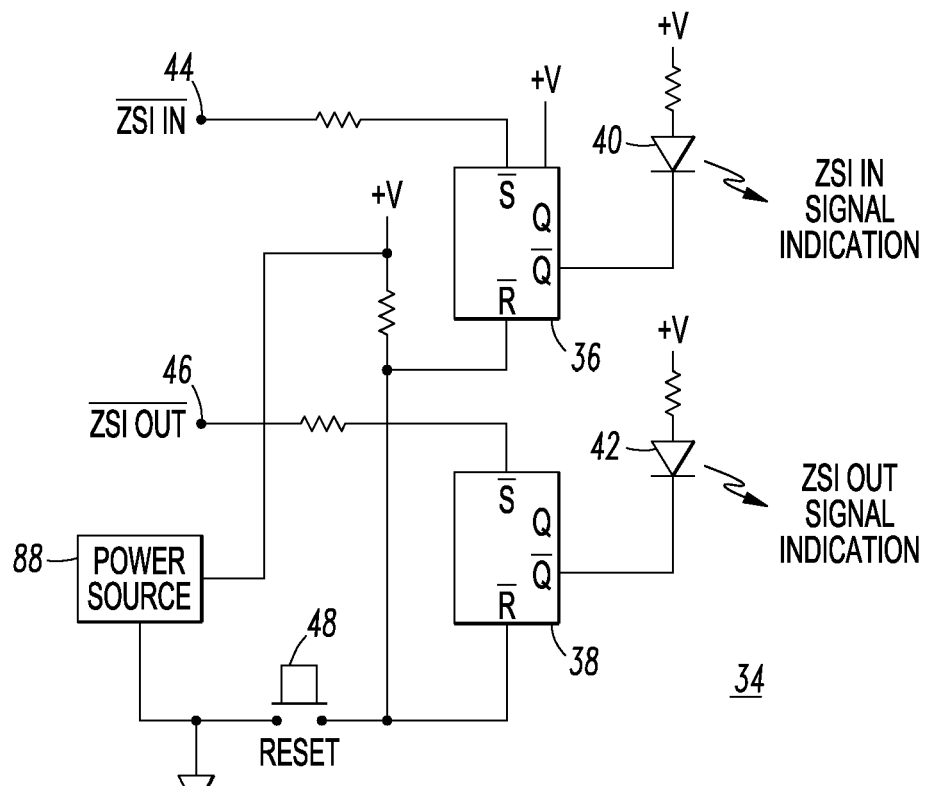
FIGS. 3 and 4 are block diagrams in schematic form of indicator circuits for a zone selective interlocking test apparatus or a circuit interrupter apparatus in accordance with other embodiments of the disclosed concept.

FIG. 3 shows an example indicator circuit 34 including two set-reset flip-flops 36,38 and two corresponding indicator lights, such as light emitting diodes (LEDs) 40,42. For example, whenever input 44 (ZSI IN/) is active low, flip-flop 36 is set, such that the LED 40 provides a corresponding ZSI IN signal indication. Whenever input 46 (ZSI OUT/) is active low, flip-flop 38 is set, such that the LED 42 provides a corresponding ZSI OUT signal indication. Then, whenever reset pushbutton 48 is depressed, both of the flip-flops 36,38 are reset, such that the LEDs 40,42 remove the corresponding ZSI IN and ZSI OUT signal indications.

Example 2

Figure 4:
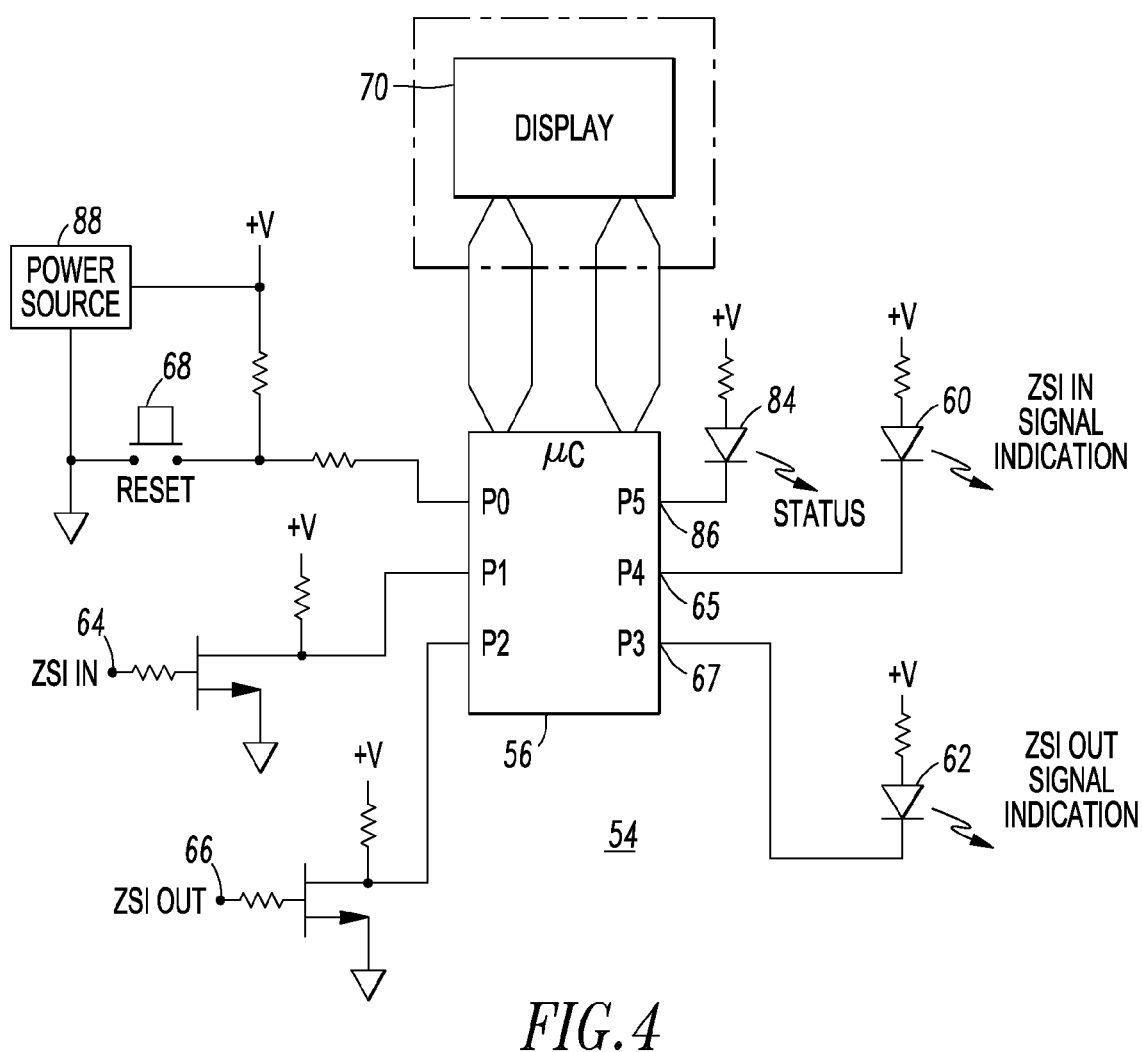

FIG. 4 shows another example indicator circuit 54 including a suitable processor, such as microcomputer (μC) 56 and two indicator lights, such as LEDs 60,62. The μC 56 includes inputs P0,P1,P2 and outputs P3,P4,P5. For example, whenever input 64 (ZSI IN) is active high, μC output 65 (P4) is set active low, such that the LED 60 provides a corresponding ZSI IN signal indication. Whenever input 66 (ZSI OUT) is active high, μC output 67 (P3) is set active low, such that the LED 62 provides a corresponding ZSI OUT signal indication. Then, whenever reset pushbutton 68 is depressed, both of the outputs 65,67 are reset inactive high, such that the LEDs 60,62 remove the corresponding ZSI IN and ZSI OUT signal indications.

Example 3

Although several example embodiments of the disclosed indicator circuits 30,34,54 are disclosed, a suitable indicator circuit can employ any one or more of transistor logic, logic gates, analog/digital logic, or processor-based implementations. For example, the logic in FIG. 3 is done with digital logic flip-flops, although the μC 56 of FIG. 4 is essentially just as inexpensive and can provide relatively more functionality, as will be discussed.

Example 4

Figure 9:
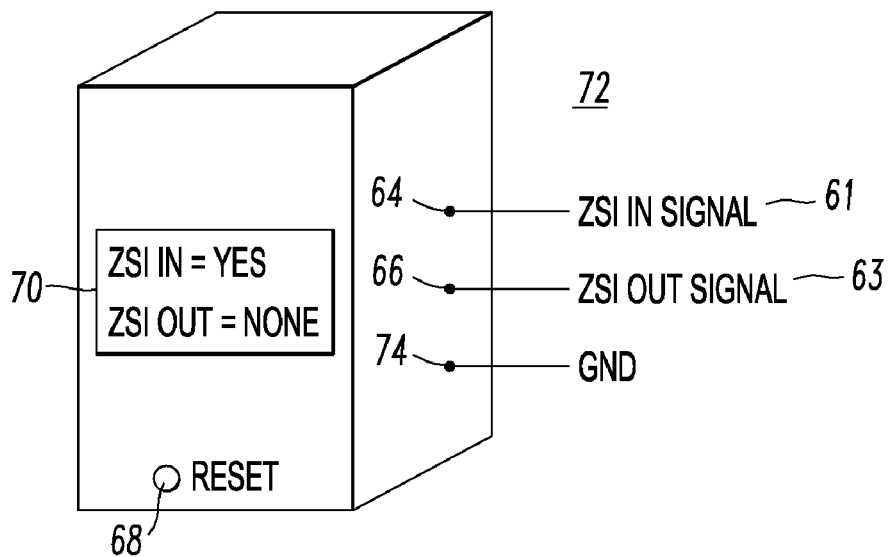
FIGS. 9 and 10 are isometric views of zone selective interlocking test devices in accordance with other embodiments of the disclosed concept.

As shown in FIGS. 4 and 9, the indicator circuit 54 can also include an optional display 70 driven by the μC 56. The μC 56 is structured to cooperate with the display 70 to display, for example, that a ZSI IN signal 61 (FIG. 9) occurred at the input 64 or that a ZSI OUT signal 63 (FIG. 9) occurred at the other input 66. For example, the corresponding device 72 including the display 70, the reset pushbutton 68 and a ground (GND) reference 74 is shown in FIG. 9. For example, the display 70 displays ZSI IN=YES for the ZSI IN signal 61 being active after a reset, and displays ZSI OUT=NONE for the ZSI OUT signal 63 being inactive after a reset. Although not shown, it will be appreciated, for example, that the display 70 displays ZSI IN=NONE for the ZSI IN signal 61 being inactive after a reset, and displays ZSI OUT=YES for the ZSI OUT signal 63 being active after a reset. Although also not shown, it will further be appreciated that both of the ZSI IN signal 61 and the ZSI OUT signal 63 may be active or inactive after a reset, and that the display 70 displays corresponding indicators of those signal states.

Example 5

Figure 10:
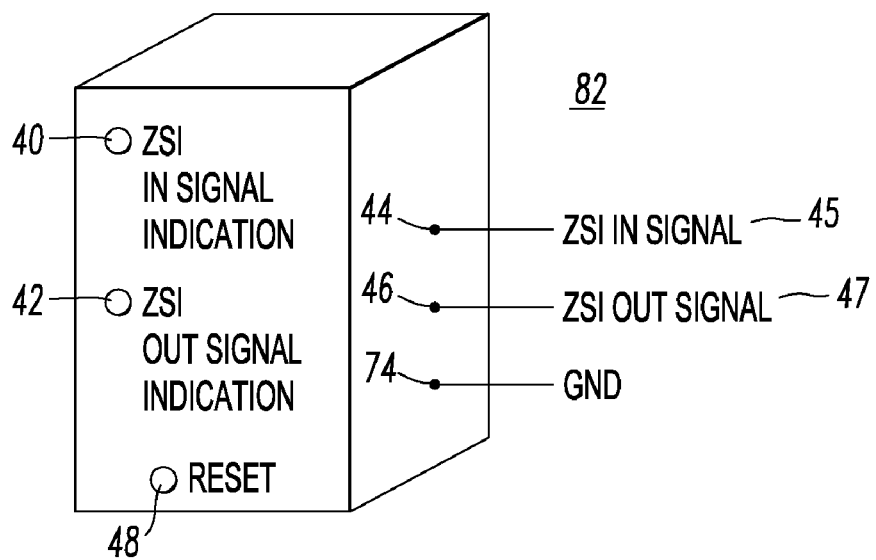

Referring to FIGS. 3 and 10, a device 82 includes the LEDs 40,42, the reset pushbutton 48 and the ground (GND) reference 74 as shown in FIG. 10. For example, the LED 40 is illuminated for the ZSI IN signal 45 (FIG. 10) being active after a reset, and the LED 42 is extinguished for the ZSI OUT signal 47 (FIG. 10) being inactive after a reset. Although not shown, it will be appreciated, for example, that the LED 40 is extinguished for the ZSI IN signal 45 being inactive after a reset, and the LED 42 is illuminated for the ZSI OUT signal 47 being active after a reset. Although also not shown, it will further be appreciated that both of the LEDs 40,42 may be active or inactive in response to corresponding states of the signals 45,47 after a reset.

Example 6

Referring again to FIG. 4, the indicator circuit 54 can further include a status indicator light, such as LED 84, driven by μC output (P5) 86. The LED 84 can indicate, for example and without limitation, a status of the indicator circuit 54, such as the health of the μC 56.

Example 7

As shown in FIGS. 9 and 10, the disclosed devices 82,72 include a reset circuit with a reset input formed by the respective reset buttons 48,68 to allow the display 70 or LEDs 40,42 to be cleared or extinguished for a subsequent test, as will be explained, below, in connection with FIGS. 6 and 7. The display 70 or the LEDs 40,42 of the respective devices 72,82 indicate if those devices captured the ZSI IN signal 61,45 and/or the ZSI OUT signal 63,47. The reset buttons 68,48 provide a reset circuit structured to remove an indication that the ZSI IN signal 61,45 occurred at the inputs 64,44, and an indication that the ZSI OUT signal 63,47 occurred at the inputs 66,46.

Example 8

As shown in FIGS. 3 and 4, a power source 88 for the indicator circuits 34,54 for the devices 72,82 of FIGS. 9 and 10 can be any suitable power source, such as a battery, a power source of a trip mechanism (e.g., of trip mechanism 20 of FIG. 2) or an external power source.

Example 9

Figure 5:
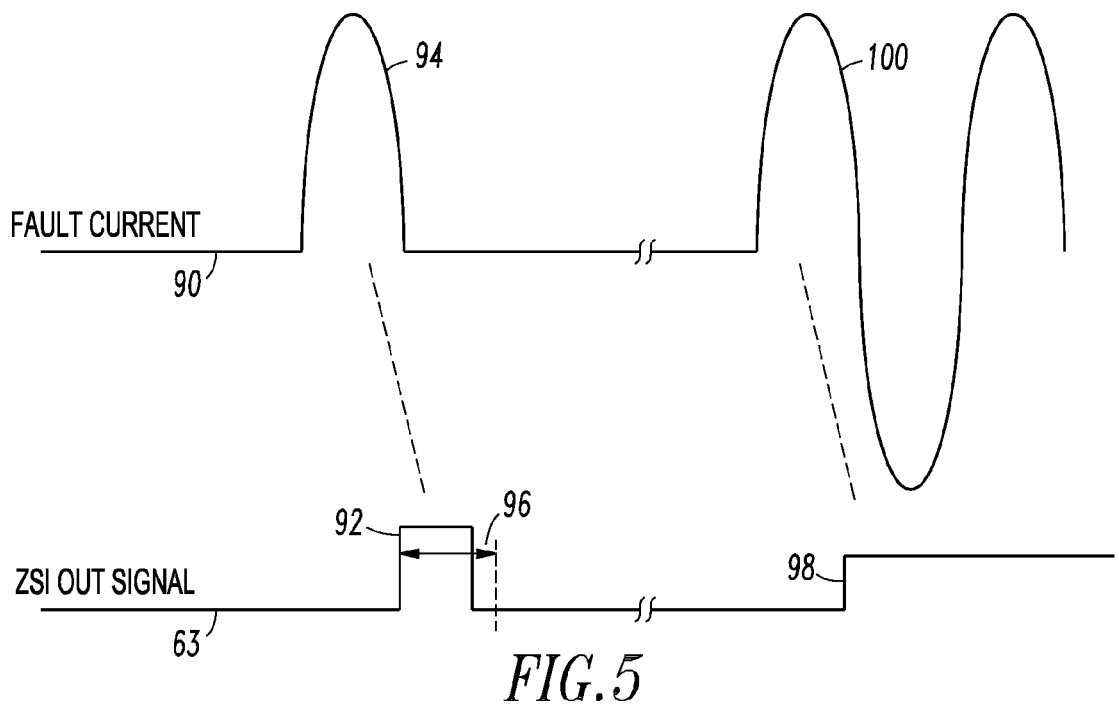
FIG. 5 is a timing diagram of fault current versus a zone selective interlocking output signal of a circuit interrupter.

The processor 56 of FIG. 4 preferably includes suitable diagnostics to show that a number of different variations of the signals at inputs ZSI IN 64 and ZSI OUT 66 were observed. FIG. 5 shows a timing diagram of fault current 90 versus the ZSI OUT signal 63 of FIG. 9. At 92, the ZSI OUT signal 63 is asserted in response to the detection of the fault current 94. Here, the processor 56 is structured to determine if the ZSI OUT signal 63 occurred for less than a predetermined time 96 (e.g., without limitation, about 10 ms) and to cooperate with the display 70 to display (e.g., "ZSI OUT=10 ms NO TRIP") that the ZSI OUT signal 63 occurred at the ZSI OUT input 66 (FIG. 4) and was not associated with a corresponding trip of a circuit interrupter. For example, the example fault current 94 is associated with only a positive half-cycle (e.g., 8.33 ms at 60 Hz) of the alternating current waveform. Since the fault current 94 did not persist, the trip mechanism (e.g., 20 of FIG. 2) did not determine a trip condition and the ZSI OUT signal 63 was cleared.

Conversely, at 98, the ZSI OUT signal 63 is asserted in response to the detection of the fault current 100, which persists for a plurality of positive and negative half-cycles of the alternating current waveform. Hence, the processor 56 determines that the ZSI OUT signal 63 occurred for greater than the predetermined time 96 and cooperates with the display 70 to display (e.g., "ZSI OUT=YES") since the ZSI OUT signal 63 occurred at the ZSI OUT input 66 (FIG. 4) and was associated with a corresponding trip of the circuit interrupter.

Hence, metering the time that one or both of the ZSI IN signal 61 and the ZSI OUT signal 63 are active can be a valuable diagnostic tool. Additional examples of this are discussed, below, in connection with FIG. 8 and Examples 16-18.

Example 10

Referring to FIG. 6, a power distribution system 102 includes a plurality of circuit interrupter zones 104, such as ZONE 1, ZONE 2 and ZONE 3; and a plurality of circuit interrupters, such as circuit breakers CB1 106, CB2 108, CB3 110, CB4 112 and CB5 114. Each of the example circuit breakers 106,108,110,112,114 is in one of the zones 104. For example, circuit breakers CB1 106 and CB2 108 are in ZONE 3, circuit breakers CB3 110 and CB4 112 are in ZONE 2, and circuit breaker CB5 114 is in ZONE 1. Each of the example circuit breakers 106,108,110,112,114 is operatively associated with a corresponding one of the respective devices M1 116, M2 118, M3 120, M4 122, M5 124, which are the same as or similar to one of the devices 72,82 of FIGS. 9 and 10. Although the devices 116,118,120,122,124 are shown as being external to the circuit breakers 106,108,110,112,114, respectively, the function of these devices may be internal (see, for example, device 14 of FIG. 2) to such circuit breakers. As shown, for example, with circuit breaker CB5 114 and device M5 124, and as was discussed above in connection with FIG. 2, the device M5 124 includes the first input (ZSI IN) 26 electrically interconnected with the zone selective interlocking input (ZSI IN) 22 of the circuit breaker CB5 114, and the second input (ZSI OUT) 28 electrically interconnected with the zone selective interlocking output (ZSI OUT) 24 of the circuit breaker CB5 114. As shown, for example, with circuit breaker CB3 110 and circuit breaker CB5 114, the ZSI OUT 24 of CB3 110 in ZONE 2 is electrically interconnected with the ZSI IN 22 of CB5 114 of the adjacent upstream ZONE 1.

Example 11

As shown in FIG. 6, the devices 116,118,120,122,124 preferably include a transceiver 126 (e.g., without limitation, a wireless transceiver, as shown; a wired transceiver) structured to communicate to a communication network 127 (e.g., without limitation, a wireless communication network, such as a wireless local area network, as shown; a wired communication network) a number of transitions and a number of transition times of the zone selective interlocking signals at the inputs 26,28. For example, the processor 56 of FIG. 4 can count the number of low-to-high transitions of the inputs 26,28 and/or the number of high-to-low transitions of the inputs 26,28, along with the periods of time that the inputs 26,28 are high and/or low, and communicate the same using the transceiver 126.

Example 12

The information from Example 11 can be communicated to a suitable processor 128 over the communication network 127. The processor 128 is structured to receive communications of the number of transitions and the number of transition times from the devices 116,118,120,122,124 for suitable processing and analysis.

Example 13

Further to Examples 11 and 12, the processor 56 of FIG. 4 can be structured to receive a reset signal 130 and/or a time synchronization signal 132 through its transceiver 126 from the processor 128 of FIG. 6 over the communication network 127. When the reset signal 130 is received, the processor 56 of FIG. 4 of each of the devices 116,118,120,122,124 takes the same action as if the manual reset pushbutton 68 was pressed. Hence, all of these devices, which can be physically separated, can be reset from a single location. The time synchronization signal 132 preferably resets a timer (not shown) or sets a real time clock (not shown) of the processor 56 of each of the devices 116,118,120,122,124, in order that real or relative times can be assigned to the transition times of the zone selective interlocking signals at the inputs 26,28. Again, this action can be taken from a single location at the processor 128. Preferably, the processor 128 is structured to provide at least one of: (1) receiving and displaying on display 129 timing of the zone selective interlocking inputs 26,28 from each of the devices 116,118,120,122,124 for each of the respective circuit breakers 106,108,110,112,114; (2) actuating the reset circuit of the processor 56 of FIG. 4 of each of the devices 116,118,120,122,124 at about the same time; and (3) synchronizing the timing of each of the devices 116,118,120, 122,124. For example, this can enable all of the devices 116,118,120,122,124 to be connected together to show the timing of the various ZSI signals (e.g., which occurred first, second, third and so forth), with the devices being reset all at once, and the devices being time synchronized to show the real or relative times of the signal transitions.

Example 14

As shown in FIG. 6, steering diodes 130 are preferably employed to prevent an improper back feed to the ZSI OUT 28 input of a downstream device from an upstream circuit breaker or device or to the ZSI OUT 28 input of a device from another circuit breaker or device in the same zone (e.g., device M4 122 should not see the ZSI OUT signal from CB3 110; device M3 120 should not see the ZSI OUT signal from CB4 112). For example, as shown in ZONE 3, the blocking diode 130 is electrically connected between the ZSI IN input 22 of CB3 110 in ZONE 2 and the ZSI OUT output 24 of CB1 106 in ZONE 3. Similarly, as shown in ZONE 2, the blocking diode 130 is electrically connected between the ZSI IN input 22 of CB5 114 in ZONE 1 and the ZSI OUT output 24 of CB3 110 in ZONE 2.

Example 15

When a switchgear system is wired for zone selective interlocking (ZSI) (e.g., as shown in FIG. 6), physically, there are cells of circuit breakers spread throughout the switchgear. ZSI wires for the various ZSI signals are routed between the circuit breakers (e.g., 106,108,110,112,114) according to a wiring diagram designed by engineers. The problem with ZSI input and ZSI output signals is that they come out of the circuit breakers relatively very fast and last for a relatively short time. These ZSI signals only appear on or at the circuit breaker trip unit for less than about 100 ms. Hence, suitable high speed devices (e.g., 116,118,120,122,124) capture these signals, in order to know that they appeared at the proper circuit breakers (e.g., 106,108,110,112,114) at the right times. The disclosed devices are coupled to the ZSI input 22 and ZSI output 24 with a common ground (e.g., GND 74 of FIGS. 9 and 10) for each circuit breaker. The disclosed devices look at the ZSI input and ZSI output signals to capture those signals and indicate and hold that indication that the signals appeared. Preferably, the disclosed devices have a display (e.g., 70 of FIG. 4) or other suitable indicator (e.g., 40,42 of FIG. 3) that allows the user (e.g., customer; person who builds switchgear, panelboard, switch board, or other ZSI system or devices) to determine that the ZSI wiring was done correctly and that the proper ZSI signals were received or were not received.

The following describes one example of how to initiate a trip signal from a trip unit to force the trip unit to send out a ZSI OUT signal, such as 63 or 47 of FIGS. 9 and 10, in order that the power distribution system can be tested. Large current signals cannot easily be applied to a bus system to test the system. The ZSI signals only come out when the short delay protection is applied by the trip unit. This short delay protection is in the range of two to ten times the continuous rated current of the corresponding circuit breaker. For a relatively large circuit breaker, this could be, for example, 32,000 amps. This is too large to apply to the whole system, is too dangerous and is not practical. When the circuit breakers are tested with a tester, usually a secondary current is applied to one and only one circuit breaker at a time. This makes it difficult to see if an intended circuit breaker upstream has seen the ZSI signals. Also, in the event of a wiring error, it is difficult to see if a particular circuit breaker improperly saw the ZSI signals from the tested circuit breaker.

As shown in FIG. 6, the disclosed devices 116,118,120, 122,124 couple to the ZSI IN input 22 and the ZSI OUT output 24 to capture the ZSI signals in and out, in order to see if the ZSI wiring is correct. The devices 116,118,120,122,124 are added to or included within each circuit breaker in the power distribution system so that all the circuit breakers are covered. A secondary test current is applied to a circuit breaker of interest at the Short Delay Pick-up level. After this circuit breaker trips, the devices 116,118,120,122,124 are checked (e.g., locally at each device; globally at the processor 128) to see if the ZSI OUT signal from the tested circuit breaker got to the proper number of circuit breakers or conversely did not go to any circuit breakers that should not have received that ZSI OUT signal. Then, all of the devices 116, 118,120,122,124 are reset or cleared (e.g., locally at each device using the reset pushbutton 48 or 68 of FIGS. 3 and 4; globally at the processor 128 using the reset signal 130) and the process is repeated with another circuit breaker being tested with the secondary test current.

Referring to FIG. 7, a ZSI test procedure 140 is shown for a power distribution system (e.g., 102 of FIG. 6) including a plurality of zones (e.g., without limitation, as shown by the three zones 104 of FIG. 6). At 142, a plurality of circuit interrupters (e.g., circuit breakers 106,108,110,112,114) are employed in the power distribution system, each of the circuit interrupters being in one of the zones of the power distribution system and including a ZSI input (e.g., 22) and a ZSI output (e.g., 24). At 144, the ZSI OUT output 24 of one of the circuit interrupters (e.g., CB3 110) in one of the zones (e.g., ZONE 2) is electrically interconnected with the ZSI IN input 22 of another one of the circuit interrupters (e.g., CB5 114) in another upstream one of the zones (e.g., ZONE 1). Next, at 146, a trip is caused (e.g., as was discussed above) of such one of the circuit interrupters (e.g., CB3 110). Then, at 148, the ZSI OUT output 24 of such one of the circuit interrupters (e.g., CB3 110) in such one of the zones (e.g., ZONE 2) is output to the ZSI IN input 22 of the other one of the circuit interrupters (e.g., CB5 114) in the other upstream one of the zones (e.g., ZONE 1). Next, at 150, devices (e.g., 116,118, 120,122,124) are operatively associated with each of the circuit interrupters (e.g., 106,108,110,112,114) to monitor the ZSI IN input 22 and the ZSI OUT output 24 thereof. Then, at 152, the devices operatively associated with each of the circuit interrupters indicate whether the ZSI IN input 22 and the ZSI OUT output 24 thereof occurred. Finally, at 154, the devices operatively associated with each of the circuit interrupters are checked to verify that the ZSI OUT output 24 of the one of the circuit interrupters (e.g., CB3 110) was received by a proper count (e.g., a count of two example CBs 110,114 in this example) of the circuit interrupters and conversely was not received by any of the circuit interrupters (e.g., the other three example CBs 106,108,112 in this example) that should not have received the ZSI OUT output of that one of the circuit interrupters (e.g., CB3 110).

As was discussed above in connection with FIGS. 4 and 9, the display 70 of the devices (e.g., 116,118,120,122,124) operatively associated with each of the circuit interrupters (e.g., 106,108,110,112,114) indicate following a reset of the devices the occurrence or non-occurrence of the ZSI OUT output 24 and the ZSI IN input 22 thereof.

In turn, after the devices are reset (e.g., as was discussed above in connection with FIGS. 3, 4 or Example 13), a trip is caused of another one of the circuit interrupters, as at 146, and even steps 148 to 154 of FIG. 7 are repeated to check the corresponding ZSI wiring and logic.

It will be appreciated that this ZSI test procedure 140 can be performed using the example devices 116,118,120,122, 124 with or without the processor 128.

Example 16

Figure 8:
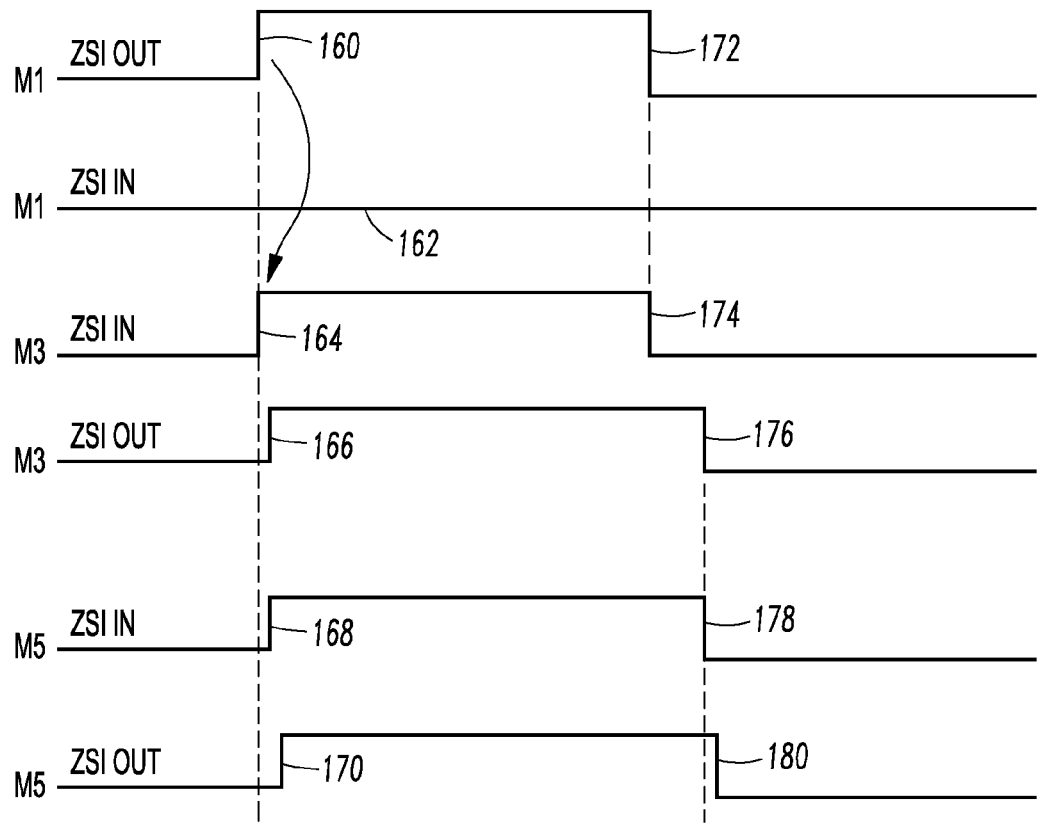
FIG. 8 is a timing diagram of zone selective interlocking input and output signals for the power distribution system of FIG. 6.

Referring to FIG. 8, a timing diagram shows example ZSI OUT and ZSI IN signals monitored by the devices M1 116, M3 120 and M5 124 of FIG. 6. Although these are described using the M1,M3,M5 references of the devices, they could alternatively be described using the respective CB1,CB3, CB5 references of the corresponding circuit interrupters. At transition 160, a fault is detected by CB1 106 and M1 ZSI OUT is set. At inactive signal 162, M1 ZSI IN is inactive, since there is no downstream circuit breaker. At transition 164, M3 ZSI IN to CB3 110 follows M1 ZSI OUT. Then, at transition 166, CB3 110 responsively sets M3 ZSI OUT. At transition 168, M5 ZSI IN to CB5 114 follows M3 ZSI OUT. Then, at transition 170, CB5 114 responsively sets M5 ZSI OUT.

M1 ZSI OUT persists until, at transition 172, CB1 106 opens and clears the fault that it detected at 160. M1 ZSI IN has remained inactive, since there is no downstream circuit breaker. At transition 174, M3 ZSI IN to CB3 110 follows M1 ZSI OUT and goes inactive. Then, at transition 176, since the fault current has been interrupted by CB1 106, CB3 110 responsively clears M3 ZSI OUT. At transition 178, M5 ZSI IN to CB5 114 follows M3 ZSI OUT and goes inactive. Then, at transition 180, since the fault current has been interrupted by CB1 106, CB5 114 responsively clears M5 ZSI OUT.

For example, between transition 160 and transition 172, the processor 56 of FIG. 4 of the device M1 116 is structured to determine if the ZSI OUT output 24 (its ZSI OUT input 28) occurred for greater than a predetermined time (e.g., without limitation, 50 ms) and to cooperate with the display 70 to display (e.g., ZSI OUT=50 ms TRIP) in order to indicate that the ZSI OUT output 24 occurred at its ZSI OUT input 28 and was associated with a trip of the corresponding circuit interrupter CB1 106.

Example 17

For example, between transitions 160, 164 and 168 and respective transitions 172, 174 and 178, the processor 56 of FIG. 4 of the devices M1 116, M3 120 and M5 124 is structured to determine if the ZSI IN input 22 occurred in conjunction with the ZSI OUT output 24 and to cooperate with the display 70 to display that the ZSI OUT output 24 occurred at the device's ZSI OUT input 28 and was associated with a trip of one of: (1) the circuit interrupter CB1 106 (since device M1 116 sees ZSI OUT=55 ms TRIP; ZSI IN=off; thus, there is no circuit interrupter downstream of CB1 106); (2) the adjacent, downstream circuit interrupter CB1 106 (since device M3 120 sees ZSI OUT=60 ms TRIP; ZSI IN=on 55 ms; thus, there is the adjacent, downstream circuit breaker CB1 106 in the adjacent ZONE 3 downstream of CB3 110, which is in the adjacent upstream ZONE 2); and (3) the non-adjacent, downstream circuit interrupter CB1 106 (since device M5 124 sees ZSI OUT=60 ms TRIP; ZSI IN=on 60 ms; thus, there is the non-adjacent, downstream circuit breaker CB1 106 in the non-adjacent ZONE 3 downstream of CB5 114, which is in the non-adjacent upstream ZONE 1).

Example 18

As can be seen from the above Examples 16 and 17, the indicator circuit 54 of FIG. 4 is preferably structured to analyze timing of the ZSI IN input 22 at the ZSI IN input 26 and the ZSI OUT output 24 at the ZSI OUT input 28.

Example 19

Although separable contacts 16 are disclosed, suitable solid state separable contacts may be employed. For example, the disclosed circuit interrupter 10 includes a suitable circuit interrupter mechanism, such as the separable contacts 16 that are opened and closed by the operating mechanism 18, although the disclosed concept is applicable to a wide range of circuit interruption mechanisms (e.g., without limitation, solid state or FET switches; contactor contacts) and/or solid state based control/protection devices (e.g., without limitation, drives; soft-starters).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A power distribution system comprising:
a plurality of zones; and
a plurality of circuit interrupter apparatus, each of said circuit interrupter apparatus being in one of said zones and comprising:
separable contacts,
an operating mechanism structured to open and close said separable contacts,
a trip mechanism cooperating with said operating mechanism to trip open said separable contacts, said trip mechanism including a zone selective interlocking input and a zone selective interlocking output, and
a device comprising:
a first input electrically interconnected with said zone selective interlocking input,
a second input electrically interconnected with said zone selective interlocking output, and
an indicator circuit structured to indicate that said zone selective interlocking input occurred at said first input or that said zone selective interlocking output occurred at said second input,
wherein the zone selective interlocking output of one of said circuit interrupters in one of said zones is electrically interconnected with the zone selective interlocking input of another one of said circuit interrupters in another upstream one of said zones,
wherein the device of each of said circuit interrupters is structured to communicate to a communication network a number of transitions and a number of transition times of said zone selective interlocking input at said first input and said zone selective interlocking output at said second input.

2. The power distribution system of claim 1 wherein said communication network includes a processor structured to receive communications of said number of transitions and said number of transition times from the device of each of said circuit interrupters.

3. The power distribution system of claim 2 wherein said indicator circuit comprises a reset circuit structured to remove a first indication that said zone selective interlocking input occurred at said first input and a second indication that said zone selective interlocking output occurred at said second input; and wherein said processor is further structured to provide at least one of: (1) displaying timing of the zone selective interlocking input at the first input and the zone selective interlocking output at the second input of each of said circuit interrupters; (2) actuating the reset circuit of each of said circuit interrupters at about the same time; and (3) synchronizing the timing of the device of each of said circuit interrupters.

4. A power distribution system comprising:
a plurality of zones; and
a plurality of circuit interrupter apparatus, each of said circuit interrupter apparatus being in one of said zones and comprising:
separable contacts,
an operating mechanism structured to open and close said separable contacts,
a trip mechanism cooperating with said operating mechanism to trip open said separable contacts, said trip mechanism including a zone selective interlocking input and a zone selective interlocking output, and
a device comprising:
a first input electrically interconnected with said zone selective interlocking input,
a second input electrically interconnected with said zone selective interlocking output, and
an indicator circuit structured to indicate that said zone selective interlocking input occurred at said first input or that said zone selective interlocking output occurred at said second input, wherein the zone selective interlocking output of one of said circuit interrupters in one of said zones is electrically interconnected with the zone selective interlocking input of another one of said circuit interrupters in another upstream one of said zones, wherein the zone selective interlocking output of said one of said circuit interrupters in said one of said zones is the zone selective interlocking output of a first one of said circuit interrupters in a second one of said zones; wherein the zone selective interlocking input of said another one of said circuit interrupters in said another upstream one of said zones is the zone selective interlocking input of a second one of said circuit interrupters in a first upstream one of said zones; wherein the zone selective interlocking output of a third one of said circuit interrupters in the second one of said zones is also electrically interconnected with the zone selective interlocking input of said second one of said circuit interrupters in said first upstream one of said zones; wherein a first blocking diode is electrically connected between the zone selective interlocking input of the second one of said circuit interrupters in the first upstream one of said zones and the zone selective interlocking output of the first one of said circuit interrupters in the second one of said zones; and wherein a second blocking diode is electrically connected between the zone selective interlocking input of the second one of said circuit interrupters in the first upstream one of said zones and the zone selective interlocking output of the third one of said circuit interrupters in the second one of said zones.

5. A zone selective interlocking test method for a power distribution system including a plurality of zones, said method comprising:

employing a plurality of circuit interrupters in said power distribution system, each of said circuit interrupters being in one of said zones of said power distribution system and including a zone selective interlocking input and a zone selective interlocking output;

electrically interconnecting the zone selective interlocking output of one of said circuit interrupters in one of said zones with the zone selective interlocking input of another one of said circuit interrupters in another upstream one of said zones;

causing a trip of said one of said circuit interrupters;

outputting the zone selective interlocking output of said one of said circuit interrupters in said one of said zones to the zone selective interlocking input of said another one of said circuit interrupters in said another upstream one of said zones;

employing a device operatively associated with each of said circuit interrupters to monitor the zone selective interlocking input and the zone selective interlocking output thereof;

indicating from the device operatively associated with each of said circuit interrupters whether the zone selective interlocking input and the zone selective interlocking output thereof occurred; and checking the device operatively associated with each of said circuit interrupters to verify that the zone selective interlocking output of said one of said circuit interrupters was received by a proper count of said circuit interrupters and conversely was not received by any of said circuit interrupters that should not have received the zone selective interlocking output of said one of said circuit interrupters in said one of said zones.

6. The zone selective interlocking test method of claim 5 further comprising employing a display of the device operatively associated with each of said circuit interrupters to indicate the occurrence or non-occurrence of the zone selective interlocking output and the zone selective interlocking input thereof.

7. The zone selective interlocking test method of claim 6 further comprising resetting the device operatively associated with each of said circuit interrupters;

causing a trip of another one of said circuit interrupters;

outputting the zone selective interlocking output of said another one of said circuit interrupters;

employing the device operatively associated with each of said circuit interrupters to monitor the zone selective interlocking input and the zone selective interlocking output thereof;

indicating from the device operatively associated with each of said circuit interrupters whether the zone selective interlocking input and the zone selective interlocking output thereof occurred; and checking the device operatively associated with each of said circuit interrupters to verify that the zone selective interlocking output of said another one of said circuit interrupters was received by a proper count of said circuit interrupters and conversely was not received by any of said circuit interrupters that should not have received the zone selective interlocking output of said another one of said circuit interrupters.

* * * * *